United States Patent [19]
Kreitzer

[11] 3,850,299
[45] Nov. 26, 1974

[54] CARD TRANSPORT AND CAPTURE MECHANISM

[75] Inventor: Carl E. Kreitzer, St. Petersburg, Fla.

[73] Assignee: NCR Corporation, Dayton, Ohio

[22] Filed: Dec. 3, 1973

[21] Appl. No.: 420,926

[52] U.S. Cl............ 209/73, 209/111.7, 209/DIG. 2, 250/569
[51] Int. Cl............................................ B07c 5/342
[58] Field of Search ....... 209/73, 74, DIG. 2, 111.7, 209/111.8; 194/DIG. 6, DIG. 16, DIG. 20, 4; 232/44; 250/556, 557–559, 566–569; 235/61.7 B; 340/149 A

[56] References Cited
UNITED STATES PATENTS
| | | | |
|---|---|---|---|
| 3,039,582 | 6/1962 | Simjian | 209/DIG. 2 |
| 3,443,107 | 5/1969 | Modglin | 209/DIG. 2 |
| 3,731,799 | 5/1973 | Meloni et al. | 209/DIG. 2 |

Primary Examiner—Allen N. Knowles
Attorney, Agent, or Firm—J. T. Cavender; Albert L. Sessler, Jr.; Elmer Wargo

[57] ABSTRACT

A mechanism for feeding a credit card to a card reader located in a machine (like a cash dispensing machine) and for returning the card to a user after a routine use of the machine, or alternatively, capturing the card internally in the machine when, for example, the card is a "hot" or stolen card. A guide member having a slot therein is pivotally mounted in the machine and is used in cooperation with generally opposing pairs of drive rollers to bow or bend the card slightly as it is fed to the card reader. When a card is to be captured, the guide member is rotated to a position which prevents the card from passing through the slot in the guide member and out of the machine, and causes the card to deflect over the guide member and thereafter drop into a collection box within the machine. The "hot" card is retained in the machine until the machine is serviced by the bank staff.

11 Claims, 3 Drawing Figures

CARD TRANSPORT AND CAPTURE MECHANISM

BACKGROUND OF THE INVENTION

This invention relates to access-control equipment and dispensing systems, and more particularly, it relates to a card transport and capture mechanism therefor.

In recent years, the banking industry has been attempting to influence the general public to use fewer checks in their financial transactions due to difficulties in processing large amounts of checks and paperwork. Part of the problem has been alleviated by providing branch banks (to provide cash transactions), but branch banks are expensive to maintain.

Efforts are now being made to induce the general public to use automatic currency dispensing machines which make cash available to bank customers on a 24 hour basis. These machines are generally operated by a credit card and promise to make the banking service cheaper than the expensive, branch banks.

Naturally, to be acceptable to the public, the cash-dispensing machines must be reliable and must accurately dispense money, and be almost fool-proof in operation. Additionally, to be acceptable to the banking industry, the machines must be tamperproof and provide security for the cash stored therein.

Normally a credit card is inserted in a cash dispensing machine, and the user enters certain data (codes, quantity of currency desired, type of transaction, etc.) upon a keyboard associated with the machine. The machine will then process the transaction, update the user's account to reflect the current transaction, dispense cash if necessary, and return the card to the user as part of a routine operation.

In some situations, it is desirable that certain credit cards which are inserted in the machine be captured within the machine and not return to the user. These credit cards, which may be called "hot" cards, for convenience, are generally cards which are stolen, have expired dates thereon, or are being used by an improper user.

Accordingly, an object of this invention is to produce a card transport and capture mechanism which is compact, economical to produce, and reliable for use with a machine like a credit-card-operated, automatic, currency dispenser.

Some representative examples of related prior art devices are shown in the following U.S. Pats.:

No. 3,543,904 which issued on Dec. 1, 1970;
No. 3,629,834 which issued on Dec. 21, 1971;
No. 3,634,656 which issued on Jan. 11, 1972;
No. 3,641,497 which issued on Feb. 8, 1972;
No. 3,657,521 which issued on Apr. 11, 1972;
No. 3,673,571 which issued on June 27, 1972; and
No. 3,685,690 which issued on Aug. 22, 1972.

DETAILED DESCRIPTION OF THE INVENTION

Figure 1:
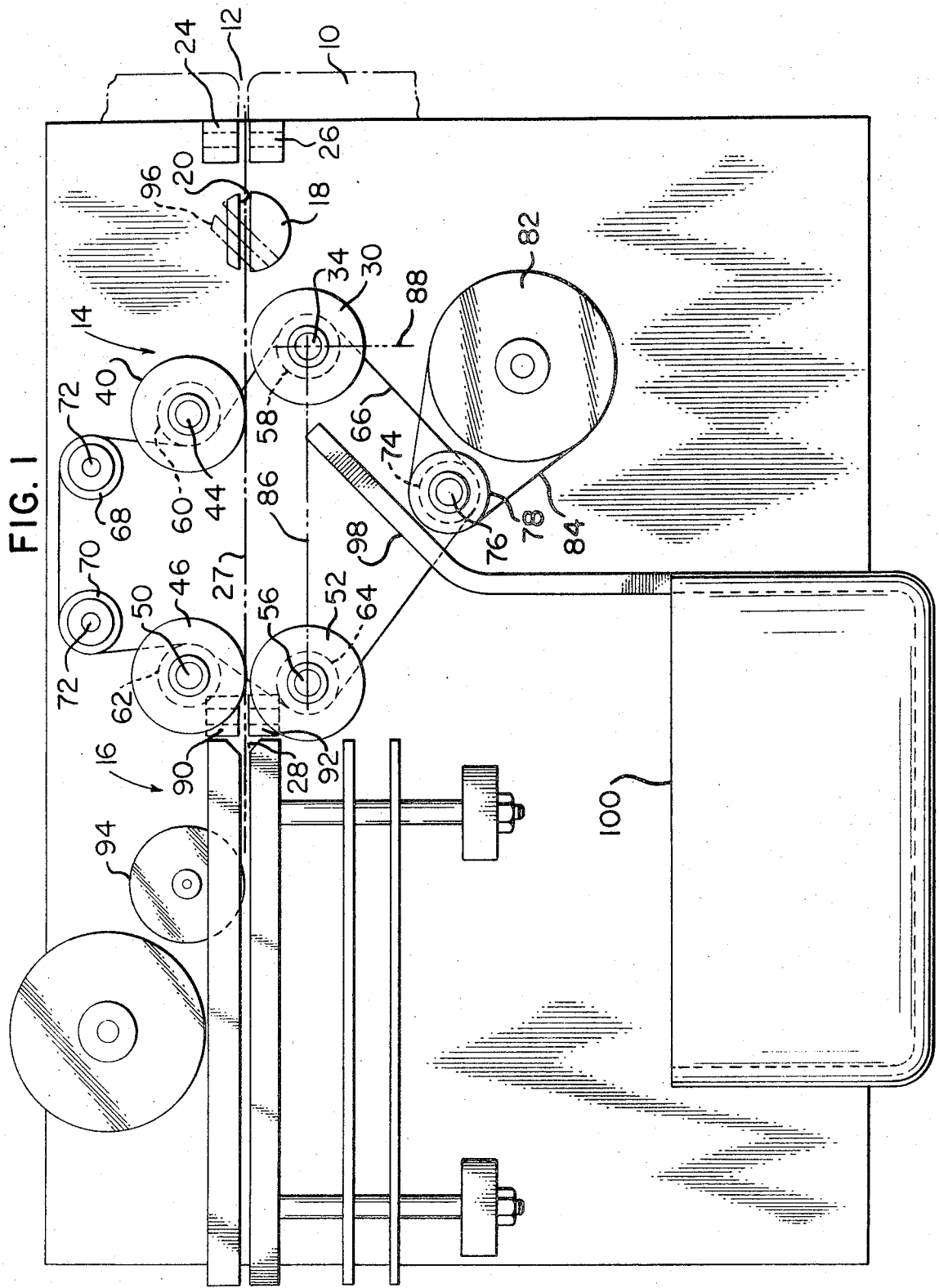
FIG. 1 is a side view, in elevation of this invention as it is positioned in a business machine, showing a guide member, card transport means, a card reader and a collection box for storing cards which are retained within the machine.

FIG. 1 is a side view of this invention as it is positioned in a business machine, which for purposes of illustration, may be a cash dispensing machine.

The machine includes an end wall 10 (FIG. 1) having a slot 12 therein to enable a user or customer to insert his token or credit card into the machine. The card transport and capture mechanism of this invention, designnated generally as 14, is positioned between the slot 12 and a card utilization means like a card reader designated generally as 16.

Figure 2:
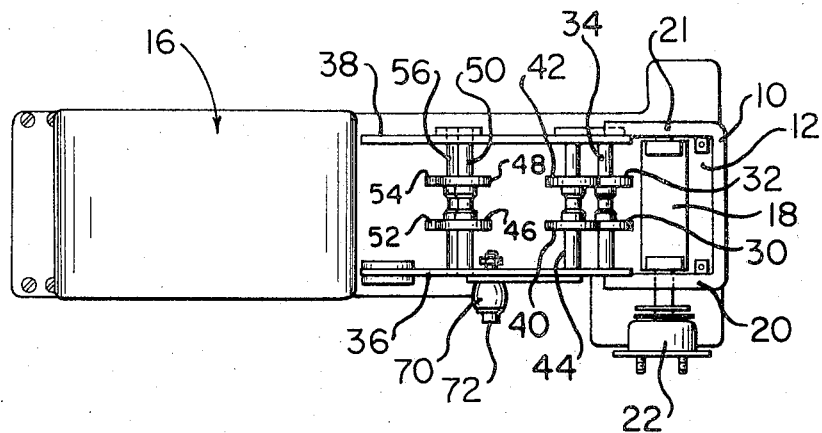
FIG. 2 is a plan view in reduced scale of the invention, showing additional details thereof as viewed from the top of FIG. 1.

The mechanism 14 (FIG. 1) includes a guide member 18 whose ends are pivotally mounted in side frames 20 and 21 (FIG. 2). The guide member 18 is generally cylindrical in shape and has an elongated slot 20 therein. The guide member 18 is rotated between a first position, shown in dashed outline in FIG. 1, and a second position shown in solid outline, by a drive means which may be a rotary solenoid 22 shown in FIG. 2. When the guide member 18 is in the first position, the associated slot 20 is misaligned with the slot 12 in the wall 10, and when the guide member is in the second position, its slot 20 is aligned with the slot 12 in the wall 10.

When the guide member 18 is in the first position, one of its functions is to prevent foreign objects from being inserted into the machine by blocking the path to the interior of the mechanism 14. When a user of the machine presents a correct card into the slot 12, sensors located at the extremities of the slot detect the presence of the correctly sized card and actuate the rotary solenoid 22 (through a control means to be later described) to rotate the guide member 18 to the second position shown in solid outline in FIG. 1.

The sensors for sensing a correctly-sized card being inserted in the mechanism 14 are located adjacent to the slot 12 in the end wall 10 as shown in FIG. 1. The card may have human-readable, embossed or raised characters on one side thereof along with a magnetic stripe on the other side thereof. The slot 12 may have notches therein to receive the embossed characters which permit a user of the card to insert the card into the mechanism 14 in only one way so that the magnetic stripe on the card is correctly oriented relative to the card reader 16. The sensors, which may be conventional, include a light emitter 24 and a light sensor 26 which are located in opposed relation (as shown in FIG. 1) on each side of the slot 12. When a card having the correct dimension (like the width of the card) is inserted in the slot 12, the sensors (like 26 on each side of the slot) are energized and the control means shown in FIG. 3 energizes the rotary solenoid 22 to rotate the guide member 18 to the second position, enabling the card to be inserted further into the mechanism 14.

A correctly-sized card which is inserted into the mechanism 14 (FIG. 1) is received by a transport or feed means which, upon command from the control means, moves the card to the card reader 16.

The transport or feed means is comprised of first and second feed means with the first feed means being located adjacent to the guide member 18 (FIG. 1) and the second feed means being located downstream from the first feed means when considering the travel of a card from the slot 12 to the card reader 16.

The first feed means includes first and second roller means which are located on opposed sides of a feed line 27 (FIG. 1) which extends through the slot 12 in end wall 10 and to the card reader 16 at an entrance slot 28 therein. The first roller means includes rollers 30 and 32 (FIGS. 1 and 2) which are fixed to a shaft 34 to rotate therewith and whose shaft ends are rotatably mounted in suitable side frames 36 and 38 (FIG. 2). The second roller means similarly includes rollers 40 and 42 which are fixed to a shaft 44 to rotate therewith and whose shaft ends are rotatably mounted in the side frames 36 and 38.

The second feed means also includes first and second roller means which are located on opposed sides of the feed line 27 previously mentioned. The first roller means includes rollers 46 and 48 which are fixed to a shaft 50 to rotate therewith and whose shaft ends are rotatably mounted in the side frames 36 and 38. The second roller means of the second feed means similarly includes rollers 52 and 54 which are fixed to a shaft 56 to rotate therewith and whose shaft ends are rotatably mounted in the side frames 36 and 38.

The drive means for drivingly rotating the rollers of the first and second feed means so as to transport a card is shown principally in FIG. 1. Each of the shafts 34, 44, 50, and 56 has an identically-sized, flat belt pulley 58, 60, 62, and 64, respectively fixed thereto to rotate the associated shaft in cooperation with a complementary, endless, flat belt 66. Two idler pulleys 68 and 70 are conventionally positioned between the belt pulleys 60 and 62 to provide sufficient wrap-around contact with the pulleys 60 and 62 so as to be in driving engagement therewith. These idler pulleys 68 and 70 are rotatably mounted on suitable stub shafts 72 which are fixed to the side frame 36. A flat, flanged, driven pulley 74 is fixed to a shaft 76 which is rotatably mounted in the side frame 36, and a driving pulley 78 is also fixed to shaft 76 to rotate it. A reversible motor 80 (FIG. 3) drives its associated pulley 82 which in turn is drivingly connected to pulley 78 by an endless belt 84. When the pulley 78 is driven in a counterclockwise direction (as viewed in FIG. 1) the flat belt 66 will accordingly rotate the pulleys 58, 60, 62, and 64 in the appropriate directions enabling the associated rollers 30, 40, 46, and 52, respectively, to advance a card passing through the slot 20 in guide member 18 to the card reader 16. When the pulley 78 is driven in a clockwise direction, the rollers of the first and second feed means just recited will move a card from the card reader 16 towards the guide member 18. All the longitudinal axes of shafts 76, 34, 44, 72, 50, and 56 are parallel to one another and are perpendicular to the direction of travel of a card passing from the guide member 18 to the card reader 16.

The locations of the longitudinal axes of shafts 34, 44, 50, and 56 relative to one another and to the guide member 18 and the card reader 16 are important for the proper functioning of the card transport and capture mechanism 14. The axes of shafts 34 and 56 lie along a reference line 86 which is parallel to the feed line 27, and a vertical line 88, perpendicular to line 27, and passing through the longitudinal axis of shaft 34 is used as a reference line for determining the horizontal displacements of the various components of the mechanism 14 therefrom. The following dimensions are illustrative of a typical embodiment using a standard credit card which is 2⅛ inches wide and 3⅜ inches long and which has a thickness of 0.030 inch, with the card having a magnetic stripe on one side thereof and human readable, raised or embossed characters on the opposite side.

| Longitudinal Axis of Shaft | Displacement (in inches) from Horizontal line 86 | Displacement (in inches) from Vertical line 88 |
| --- | --- | --- |
| 34 | 0 | 0 |
| 44 | .949 | .562 |
| 50 | .973 | 2.438 |
| 56 | 0 | 2.625 |

The rollers 30, 32, 40, 42, 46, 48, 52, and 54 are all identical, having a diameter of 0.956 inches. Each of these rollers has a periphery which is made of a substance like polyurethane which has a high coefficient of friction for engaging the surface of the card being transported therebetween.

The locations of the longitudinal axes of shafts 34, 44, 50 and 56 (FIG. 1) supporting their associated rollers, influence the feeding of a card from the guide member 18 to the card reader 16 in the following manner. As a card is pushed by a customer through the slot 20 in the guide member 18, the rollers 40 and 42 tend to deflect or bend the card slightly away from the feed line 27 as these rollers and the rollers 30 and 32 also transport it towards the card reader 16. During the time that the trailing edge of the credit card is still in the guide member 18, the leading edge of the card contacts the rollers 52 and 54 which deflect the leading edge of the card towards the feed line 27 and towards the rollers 46 and 48. The leading edge of the card is then gripped and transported between the rollers 52 and 46, and 54 and 48, and is fed into the entrance slot 28 of the card reader 16. A conventional light source 90 and associated light sensor 92, located near the entrance slot 28, indicate the presence of a card passing therebetween and produce a signal which is used by the control means to actuate the feed mechanism within the card reader 16 to feed the card in reading relationship with a read head (like a magnetic read head) within the reader. Because the card reader 16 may be conventional one like a Sankyo Seiki, Model MCT—200 which reads the magnetic stripe on a credit card, its feed mechanism is shown only as a roller 94, and the operation of it and the read head are not discussed in any further detail. It is sufficient to state that a card is read by the reader 16, and its feed mechanism then feeds the card out of the entrance slot 28 where the card is transported by the mechanism 14. The energization of the feed mechanism in the reader 16 and the mechanism 14 are controlled by the control means shown in FIG. 3.

After a normal use of the credit card, the card is returned to the user in the following manner. After the card is read by and ejected from the reader 16, the edge of the card emerging from the slot 28 passes between the light source 90 and the light sensor 92 and may indicate to the control means that the card is emerging, or the mechanism 14 may be energized in reverse whenever the reading operation is complete and the card is to be returned to the user. With the motor 80 driven in reverse, the card is driven between rollers 46, 52, and 48, 54, and then between the rollers 30, 40, and 32, 42. As the card emerges from these latter rollers, the card passes through the slot 20 in the guide member 18 which has been rotated to the second position by the control means to permit the card to pass through the slot 12 in the end wall 10, and to be returned to the user.

When a card is to be captured by the card transport and capture mechanism 14, the control means will indicate that the card is to be captured. This may be done conventionally by comparing the credit card number for the card being read with a list of numbers of stolen cards, for example. If the card is a stolen card, the control means will issue a signal to the rotary solenoid 22 to rotate the guide member 18 to the first position in which the slot 20 is misaligned with the slot 12 as shown in dashed outline in FIG. 1. During the card capture, the card is fed out of the card reader 16, and towards the guide member 18 as previously explained with a valid card being routinely returned to a user; however, because the guide member 18 is in the first position, the edge of the card approaching the guide member 18 will be deflected off the surface 96 of the guide member and will rise above the guide member 18 (as viewed in FIG. 1). As the edge closest to the guide member 18 rises above the guide member, the remaining or now trailing edge will leave the rollers 46, 52, and 48, 54, and fall towards a chute guide 98. When this occurs, the card will slide between the rollers 30, 40, and 32, 42, and gravity will cause the card to slide down the chute guide 98 into a collection box 100. Notice that the shafts 34 and 44 are located relative to each other and the feed line 27 (FIG. 1) to permit a sufficient clearance between the rollers 30, 40, and 32, 42, to enable the card to freely slide therebetwen when the card assumes the angular position of the chute guide 98 relative to the feed line 27. These shaft locations enable the card to be positively driven when the card is substantially parallel to the feed line 27 and to slip therebetween during the card capture sequence.

The locations of the various shafts 34, 44, 50, and 56, relative to the feed line 27, as previously explained, enable a card to be positively fed while feeding the card to and from the card reader 16 during the normal use thereof, and also enable the card to slip between the rollers 30, 40 and 32, 42 when the card is to be captured. The bowing or deflecting of the leading edge of a card away from the feed line 27 as the opposed rollers 30 and 42, for example, feed the card towards the card reader 16 while a portion of the card is still in the slot 20 of the guide member 18, provides for the positive feeding mentioned. When the trailing edge of the card leaves the slot 20 and it is still gripped between the rollers 30, 40 for example, the leading edge of the card contacts the rollers 52 and 54 before contacting the associated opposed rollers 46 and 48 to cause the leading edge of the card to be deflected back towards the feed line 27 to also provide for a positive feed of the card into the slot 28. The rollers of the first and second feed means are spaced apart to enable a card to be retained therebetween should the control means indicate that a re-reading of the card is necessary. When a re-reading is necessary, the card transport motor 80 is energized in the direction necessary to feed the card into the card reader 16.

Figure 3:
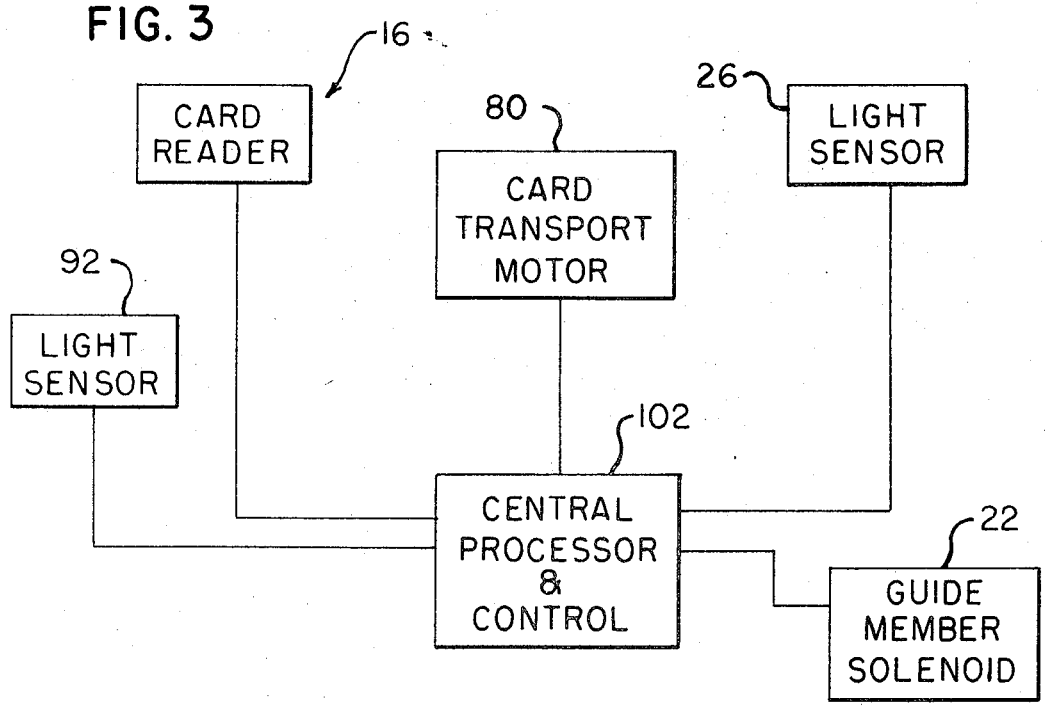
FIG. 3 is a general schematic view of a control means which may be used with the invention.

The conrol means, alluded to earlier is shown in FIG. 3. Because the control means may be conventional, it is shown only in schematic block form. The control means includes a central processor or control means 102. Naturally, the complexity or simplicity of the control means 102 is dependent upon the system in which the card transport and capture mechanism 14 is used. The card reader 16, light sensors 26 and 92, guide member solenoid 22 and card transport motor 80 may all be conventionally connected to the control means 102 to be controlled thereby as previously explained.

What is claimed is:

1. A card transport and capture mechanism for use with a cabinet having an end wall with an opening therein to receive a card; comprising:
    a guide member moveably mounted in said cabinet and having a slot therein;
    drive means for moving said guide member to a first position in which said slot is misaligned with said opening to prevent the passage of a card therethrough, and to a second position in which said slot is aligned with said opening to permit the passage of a card therethrough;
    a card utilization means;
    feed means for feeding a card inserted in said opening through said slot in a first direction to said card utilization means and thereafter feeding said card in a reverse direction out of said opening when said guide member is in said second position; and
    a card collection means located inside said cabinet and adjacent to said drive means;
    said card utilization means being effective to produce a signal when a card fed thereto is to be captured to actuate said drive means to move said guide member to said first position, whereupon a card being fed in said reverse direction towards said opening by said feed means is deflected from said opening by said guide member and enters said card collection means.

2. The mechanism as claimed in claim 1 in which said guide member has a deflecting surface thereon which causes said card to be deflected upwardly when said guide member is in said first position, enabling the card to slide between said feed means and fall into said card collection means while under the influence of gravity.

3. The mechanism as claimed in claim 2 in which said feed means comprises:
    first and second feed means positioned in said cabinet downstream of said deflector member;
    said mechanism having a feed line passing through said opening and said slot when the associated guide member is in said second position;
    said first feed means being positioned to receive a card passing through said opening and said slot when the associated guide member is in said second position and to deflect said card away from said feed line while moving said card towards said second feed means;
    said second feed means being positioned downstream of said first feed means to deflect said card towards said feed line and to move said card into said card utilization means;
    said first and second feed means also being effective to move said card in a direction towards said guide member whereby said card is deflected away from said feed line by said guide member and when the card leaves said second feed means, the card will slip between said first feed means and will fall by gravity into said card collection means.

4. The mechanism as claimed in claim 3 in which said first and second feed means are positioned between said guide member and said card utilization means and sufficiently close to each other to enable a card to be retained by said first and second feed means should re-reading of a card be necessary.

5. The mechanism as claimed in claim 4 further comprising a light sensor means positioned between said opening and said guide member to produce a conditioning signal when a properly sized card is inserted in said opening for energizing said drive means to move said guide member into said second position to enable said card to be inserted through said slot to said feed means.

6. The mechanism as claimed in claim 5 further comprising a second light sensor means positioned between said second feed means and said card utilization means to produce a read signal when the leading edge of a card to be read passes thereby.

7. A card transport and capture mechanism comprising:
   a cabinet having an end wall with an opening therein to receive a card;
   a guide member rotatably mounted in said cabinet and having a slot therein;
   drive means for rotating said guide member between a first position in which said slot is misaligned with said opening to prevent the passage of a card therethrough, and a second position in which said slot is aligned with said opening to permit the passage of a card therethrough;
   first and second feed means positioned in said cabinet downstream of said guide member;
   said mechanism having a feed line passing through said opening and said slot when the associated guide member is in said second position;
   said first feed means being positioned to receive a card passing through said opening and said slot when the associated guide member is in said second position and to deflect said card away from said feed line while moving said card toward said second feed means;
   a card utilization means; and
   said second feed means being positioned downstream of said first feed means to deflect said card towards said feed line and to move said card into said card utilization means;
   card collection means located between said first and second feed means;
   said card utilization means providing a first signal, when an invalid card has been utilized, to actuate said drive means to rotate said guide member to said first position while said first and second feed means move said card in a direction towards said guide member whereby said card is deflected away from said feed line by said guide member and when the card leaves said second feed means, the card will fall by gravity into said card collection means.

8. The mechanism as claimed in claim 7 in which said first feed means comprises first and second roller means placed on opposed sides of said feed line with the rotating axes thereof being parallel to each other but with the axis of one of said first and second roller means being located further downstream from said deflector member so as to deflect said card away from said feed line while moving said card towards said second feed roller means.

9. The mechanism as claimed in claim 8 in which said second feed roller means comprises first and second roller means placed on opposed sides of said feed line with the rotating axes thereof being parallel to each other but with the axis of one of said first and second roller means of the second feed roller means being located further downstream from said guide member so as to deflect said card towards said feed line while moving said card towards said utilization means.

10. The mechanism as claimed in claim 9 in which said guide member is pivotally mounted in said cabinet and has a deflecting surface thereon to deflect said card upwardly away from said feed line when said guide member is moved to said first position and said first and second feed means move said card in said direction towards said guide member, whereby said card freely passes between said first and second roller means of said first feed means to fall into said card collection means;
   said second roller means of said first feed means being located further downstream from said guide member than the associated first feed roller means.

11. A card transport mechanism comprising:
   a frame means having an end wall with an opening therein to receive a card;
   a deflector member rotatably mounted in said frame means and having a slot therein;
   drive means for rotating said deflector member between a first position in which said slot is misaligned with said opening to prevent the passage of a card therethrough, and a second position in which said slot is aligned with said opening to permit the passage of a card therethrough;
   first and second feed roller means positioned in said frame means downstream of said deflector member;
   said mechanism having a feed line passing through said opening and said slot when the associated deflector member is in said second position;
   said first feed roller means being positioned to receive a card passing through said opening and said slot when the associated deflector member is in said second position and to deflect said card away from said feed line while moving said card towards said second feed roller means; and
   said second roller means being positioned downstream of said first feed roller means to deflect said card towards said feed line and into a card utilization means.

\* \* \* \* \*